(12) United States Patent
Shigeno et al.

(10) Patent No.: US 11,415,050 B2
(45) Date of Patent: Aug. 16, 2022

(54) CONTAMINATION REMOVING DEVICE AND TURBOCHARGER INCLUDING CONTAMINATION REMOVING DEVICE

(71) Applicant: MITSUBISHI HEAVY INDUSTRIES ENGINE & TURBOCHARGER, LTD., Sagamihara (JP)

(72) Inventors: Yoshinori Shigeno, Sagamihara (JP); Yoshitomo Noda, Tokyo (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 60 days.

(21) Appl. No.: 16/638,189

(22) PCT Filed: Aug. 31, 2017

(86) PCT No.: PCT/JP2017/031482
§ 371 (c)(1),
(2) Date: Feb. 11, 2020

(87) PCT Pub. No.: WO2019/043893
PCT Pub. Date: Mar. 7, 2019

(65) Prior Publication Data
US 2020/0362755 A1 Nov. 19, 2020

(51) Int. Cl.
*F02C 7/06* (2006.01)
*F01M 1/10* (2006.01)
(Continued)

(52) U.S. Cl.
CPC ............... *F02C 7/06* (2013.01); *F01M 1/10* (2013.01); *F01M 11/03* (2013.01); *F02C 3/04* (2013.01);
(Continued)

(58) Field of Classification Search
CPC .... F02C 7/06; F02C 3/04; F01M 1/10; F01M 11/03; F01M 2001/1028;
(Continued)

(56) References Cited

U.S. PATENT DOCUMENTS

| 7,040,874 B1 | 5/2006 | Martin et al. |
| 2006/0193734 A1 | 8/2006 | Martin et al. |

(Continued)

FOREIGN PATENT DOCUMENTS

| CN | 101103179 A | 1/2008 |
| CN | 102537640 A | 7/2012 |

(Continued)

OTHER PUBLICATIONS

Office Action dated Apr. 15, 2021 issued in counterpart European Application No. 17923462.0.
(Continued)

*Primary Examiner* — Yi-Kai Wang
(74) *Attorney, Agent, or Firm* — Birch, Stewart, Kolasch & Birch, LLP

(57) ABSTRACT

A contamination removing device for removing a contamination from oil for lubricating a rolling bearing supporting a rotary shaft of a turbocharger includes a body portion including an oil channel for the oil to flow, and a contamination removing element for removing the contamination from the oil flowing through the oil channel, the contamination removing element being provided in the oil channel. The body portion is configured to be detachable from the housing so that the oil channel and an oil supply channel for the oil to flow communicate with each other, the oil supply channel being formed in a housing of the turbocharger.

7 Claims, 16 Drawing Sheets

(51) Int. Cl.
    *F01M 11/03*     (2006.01)
    *F02C 3/04*     (2006.01)

(52) U.S. Cl.
    CPC ............ *F01M 2001/1028* (2013.01); *F01M 2001/1042* (2013.01); *F01M 2011/031* (2013.01); *F05D 2220/40* (2013.01); *F05D 2240/50* (2013.01); *F05D 2260/98* (2013.01)

(58) Field of Classification Search
    CPC ...... F01M 2001/1042; F01M 2011/031; F05D 2220/40; F05D 2240/50; F05D 2260/98
    USPC ....................................................... 60/39.08
    See application file for complete search history.

(56) References Cited

U.S. PATENT DOCUMENTS

| | | | | |
|---|---|---|---|---|
| 2010/0059317 | A1* | 3/2010 | Palazzolo | F01D 25/18 184/6.16 |
| 2012/0045907 | A1* | 2/2012 | Sasaki | H02K 5/225 439/38 |
| 2014/0127051 | A1 | 5/2014 | Takahashi et al. | |
| 2016/0215688 | A1 | 7/2016 | Naruoka | |

FOREIGN PATENT DOCUMENTS

| | | | |
|---|---|---|---|
| CN | 103649495 | A | 3/2014 |
| JP | 56-81107 | U | 7/1981 |
| JP | 59-16492 | Y2 | 5/1984 |
| JP | 60-139040 | U | 9/1985 |
| JP | 6-212989 | A | 8/1994 |
| JP | 6-264755 | A | 9/1994 |
| JP | 7-25250 | U | 5/1995 |
| JP | 2010-96120 | A | 4/2010 |
| JP | 2012-57544 | A | 3/2012 |
| WO | WO 2015/072561 | A | 5/2015 |

OTHER PUBLICATIONS

Office Action dated Mar. 30, 2021 issued in counterpart Chinese Application No. 201780093501.0 with an English Translation.
Written Opinion of the International Searching Authority and International Search Report, dated Feb. 19, 2020, for International Application No. PCT/JP2017/031482, with English translations.
Office Actioin dated Jan. 26, 2021 issued in counterpart Japanese Application No. 2019-538865 with English Translation.
Extended European Search Report dated Apr. 2, 2020 issued in the corresponding European Application No. 17923462.0.

* cited by examiner

CONTAMINATION REMOVING DEVICE AND TURBOCHARGER INCLUDING CONTAMINATION REMOVING DEVICE

TECHNICAL FIELD

The present disclosure relates to a contamination removing device and a turbocharger including the contamination removing device.

BACKGROUND

In order to support a rotary shaft of a turbocharger, a sliding bearing such as a floating bush is adopted. In recent years, however, a rolling bearing is adopted for a loss reduction. Patent Document 1 discloses a turbocharger with a rotary shaft supported by a rolling bearing. In the turbocharger of Patent Document 1, the rolling bearing is configured to be lubricated with oil lubricating each part of an engine during operation of the engine and to be washed away with clean oil stored in another place.

CITATION LIST

Patent Literature

Patent Document 1: 2012-57544A

SUMMARY

Technical Problem

The lifetime of a rolling bearing is significantly influenced by the quality and the quantity of contaminations included in oil. In general, it is required to lubricate the rolling bearing with oil which includes less contaminations than oil lubricating each part of an engine. Thus, the problem arises in that the lifetime of the rolling bearing may be shortened if the rolling bearing is lubricated with the oil lubricating each part of the engine as in Patent Document 1. In contrast, using a filter suitable for the oil lubricating the rolling bearing to remove contaminations from the oil lubricating each part of the engine, the problem arises in that the filter is clogged in a short term because of its small mesh size.

In view of the above, an object of at least one embodiment of the present invention is to provide a contamination removing device and a turbocharger including the contamination removing device. The contamination removing device can remove contaminations from oil to such an extent suitable for lubricating the rolling bearing supporting a rotary shaft of the turbocharger and can easily be replaced when its contamination removal performance decreases.

Solution to Problem (1) A contamination removing device according to at least one embodiment of the present invention is a contamination removing device for removing a contamination from oil for lubricating a rolling bearing supporting a rotary shaft of a turbocharger, the contamination removing device including a body portion including an oil channel for the oil to flow, and a contamination removing element for removing the contamination from the oil flowing through the oil channel, the contamination removing element being provided in the oil channel. The body portion is configured to be detachable from the housing so that the oil channel and an oil supply channel for the oil to flow communicate with each other, the oil supply channel being formed in a housing of the turbocharger.

With the above configuration (1), since it is possible to attach, to the contamination removing device, a contamination removing element having specifications different from specifications of a contamination removing element for removing the contamination from the oil for lubricating each part of the internal combustion engine provided with the turbocharger, it is possible to remove the contamination from the oil to such an extent suitable for lubricating the rolling bearing. Moreover, since the body portion including the contamination removing element is detachable from the housing of the turbocharger, it is possible to easily replace the contamination removing element when contamination removal performance thereof decreases.

(2) In some embodiments, in the above configuration (1), the body portion includes an insertion attachment portion configured to be insertable into the oil supply channel from an opening of the oil supply channel in the housing, and one open end of the oil channel is disposed in the insertion attachment portion.

With the above configuration (2), it is possible to easily attach the body portion to the turbocharger by inserting the insertion attachment portion into the oil supply channel from the opening of the oil supply channel.

(3) In some embodiments, in the above configuration (2), in the body portion, a connection portion is formed on a side of the other open end of the oil channel, the connection portion being connected to a pipe for the oil which is supplied from an internal combustion engine provided with the turbocharger.

With the above configuration (3), it is possible to easily connect the pipe for the oil for lubricating each part of the internal combustion engine to the contamination removing device.

(4) In some embodiments, in the above configuration (3), an inner diameter of the connection portion and an outer diameter of the insertion attachment portion have the same diameter.

With the above configuration (4), since it is possible to attach the body portion between the oil supply channel and the pipe for the oil for lubricating each part of the internal combustion engine, it is possible to use the contamination removing device for an existing turbocharger.

(5) In some embodiments, in any one of the above configurations (2) to (4), the insertion attachment portion includes a first male screw formed on an outer circumferential surface thereof, the oil supply channel includes a first female screw formed on an inner circumferential surface thereof from the opening thereof toward the rolling bearing, and the body portion includes a tool fixing portion fixing a tool to the body portion, the tool being used to turn the body portion in order to screw the first male screw and the first female screw together.

With the above configuration (5), since the body portion is easily turned by fixing the tool to the tool fixing portion, it is possible to easily attach the body portion to the housing of the turbocharger.

(6) In some embodiments, in the above configuration (1), the oil supply channel includes a first oil supply channel portion including an opening of the oil supply channel in the housing, and a second oil supply channel portion communicating with the rolling bearing, and the oil channel makes the first oil supply channel portion and the second oil supply channel portion communicate with each other by attaching the body portion to the housing such that the body portion intersects the oil supply channel between the rolling bearing and the opening of the oil supply channel in the housing.

With the above configuration (6), forming, in advance, a configuration for inserting the body portion into the housing, it is possible to attach the body portion to the housing just by inserting the body portion into the configuration. Thus, it is possible to easily attach the body portion.

(7) In some embodiments, in any one of the above configurations (1) to (6), the oil channel includes a second female screw formed on an inner circumferential surface thereof, the contamination removing element includes a second male screw screwable to the second female screw, and the second male screw is screwed to the second female screw to provide the contamination removing element in the oil channel.

With the above configuration (7), it is possible to easily provide the contamination removing element in the oil channel by screwing the second male screw to the second female screw.

(8) In some embodiments, in any one of the above configurations (1) to (7), the contamination removing device includes a retaining portion preventing the contamination removing element from falling off the oil channel in a state in which a pipe for the oil is connected to the oil channel or the oil supply channel and the body portion is attached to the housing, the oil being supplied from an internal combustion engine provided with the turbocharger.

With the above configuration (8), it is possible to prevent the contamination removing element from falling off the oil channel by restricting movement of the contamination removing element by the retaining portion even if the contamination removing element provided in the oil channel moves within the oil channel during operation of the turbocharger.

(9) In some embodiments, in any one of the above configurations (1) to (8), the contamination removing element includes a filter provided in the oil channel.

With the above configuration (9), since it is possible to provide, in the oil channel, a filter having specifications different from specifications of the filter for the oil for lubricating each part of the internal combustion engine, it is possible to prepare oil suitable for lubricating the rolling bearing to lubricate the rolling bearing.

(10) In some embodiments, in the above configuration (9), the filter has a mesh size of 3 to 15 μm.

With the above configuration (10), since it is possible to use a filter, which may be clogged in a short term if used as the filter for the oil for lubricating each part of the internal combustion engine, only for the oil lubricating the rolling bearing, it is possible to prepare the oil lubricating the rolling bearing without causing a problem in lubricating each part of the internal combustion engine.

(11) In some embodiments, in any one of the above configurations (1) to (8), the contamination removing element includes a magnet provided in the oil channel.

Since contaminations included in oil are often substances attracted to a magnet, such as metallic powder, with the above configuration (11), it is possible to remove the contaminations from the oil by attracting the contaminations to the magnet. The magnet is not clogged unlike the filter and has a lower oil supply resistance than the filter, making it possible to suppress a possibility of a trouble in supplying oil to the rolling bearing as compared with a case in which the filter is used.

(12) A turbocharger according to at least one embodiment of the present invention includes a turbine rotor, a compressor rotor, a rotary shaft connected to the turbine rotor and the compressor rotor respectively, and rotating with the turbine rotor and the compressor rotor, a rolling bearing supporting the rotary shaft, a housing accommodating the rolling bearing, an oil supply channel through which oil for lubricating the rolling bearing flows, the oil supply channel being formed in the housing, and at least one contamination removing device according to any one of the above configurations (1) to (11) detachably attached to the housing.

With the above configuration (12), since it is possible to attach, to the contamination removing device, the contamination removing element having the specifications different from the specifications of the contamination removing element for removing the contamination from the oil for lubricating each part of the internal combustion engine provided with the turbocharger, it is possible to remove the contamination from the oil to such an extent suitable for lubricating the rolling bearing. Moreover, since the body portion including the contamination removing element is detachable from the housing of the turbocharger, it is possible to easily replace the contamination removing element when the contamination removal performance thereof decreases.

(13) In some embodiments, in the above configuration (12), the at least one contamination removing device includes a first contamination removing device and a second contamination removing device, the oil supply channel includes a first oil supply channel portion including an opening of the oil supply channel in the housing, and a second oil supply channel portion communicating with the rolling bearing, the first contamination removing device includes a first body portion including a first oil channel for the oil to flow, the first body portion includes an insertion attachment portion configured to be insertable into the oil supply channel from an opening of the oil supply channel in the housing, and in the insertion attachment portion, one open end of the first oil channel is disposed, and the second contamination removing device includes a second body portion including a second oil channel for the oil to flow, and the oil channel makes the first oil supply channel portion and the second oil supply channel portion communicate with each other by attaching the second body portion to the housing such that the second oil channel intersects the oil supply channel between the rolling bearing and the opening of the oil supply channel in the housing.

With the above configuration (13), since the contamination can be removed from the oil in two stages by the first contamination removing device and the second contamination removing device, it is possible to lubricate the rolling bearing with cleaner oil.

(14) In some embodiments, in the above configuration (13), the first contamination removing device includes a first contamination removing element which is a magnet provided in the first oil channel, and the second contamination removing device includes a second contamination removing element which is a filter provided in the second oil channel.

With the above configuration (14), since it is possible to reduce a removal quantity of the contaminations with a filter by removing the contamination from the oil with the filter provided in the second contamination removing device after removing the contaminations from the oil with the magnet provided in the first contamination removing device, it is possible to increase the lifetime of the filter.

Advantageous Effects

According to at least one embodiment of the present invention, since it is possible to attach, to a contamination removing device, a contamination removing element having specifications different from specifications of a contamination removing element for removing contaminations from oil for lubricating each part of an internal combustion engine provided with a turbocharger, it is possible to remove the contaminations from the oil to such an extent suitable for lubricating a rolling bearing. Moreover, since a body portion including the contamination removing element is detachable from the housing of the turbocharger, it is possible to easily replace the contamination removing element when contamination removal performance thereof decreases.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

Embodiment 1

Figure 1:
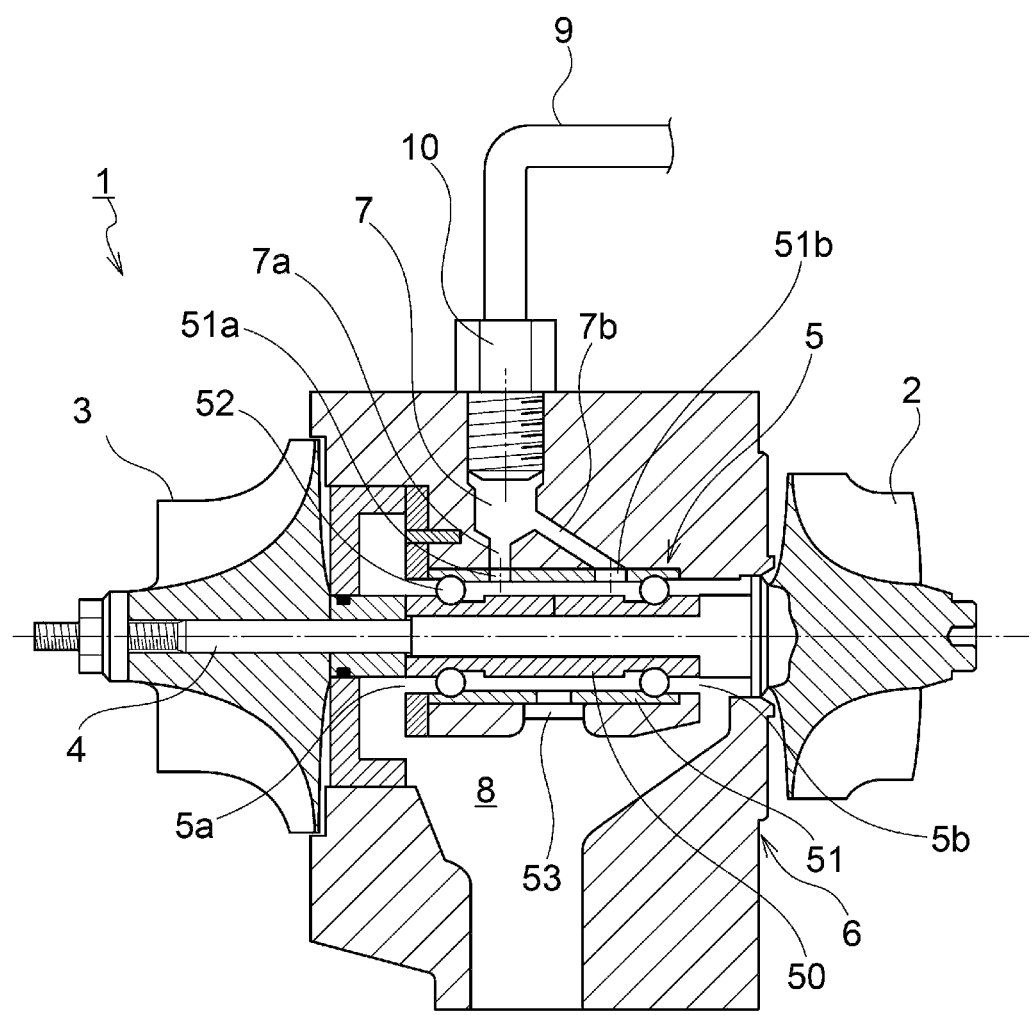
FIG. 1 is a cross-sectional view of a turbocharger according to Embodiment 1 of the present invention.

As shown in FIG. 1, a turbocharger 1 includes a turbine rotor 2, a compressor rotor 3, a rotary shaft 4 connected to the turbine rotor 2 and the compressor rotor 3 respectively and rotating with the turbine rotor 2 and the compressor rotor 3, and a rolling bearing 5 supporting the rotary shaft 4, and a housing 6 accommodating the rolling bearing 5. The housing 6 internally forms an oil supply channel 7 for supplying oil to the rolling bearing 5 and an oil discharge channel 8 for discharging oil from the turbocharger 1. The oil supply channel 7 and a pipe 9 for oil supplied from an engine (internal combustion engine) (not shown) provided with the turbocharger 1 communicate with each other via a contamination removing device 10 detachably attached to the housing 6.

The rolling bearing 5 is arranged so as to support the rotary shaft 4 between the turbine rotor 2 and the compressor rotor 3. The rolling bearing 5 includes a cylindrical inner race 50 coaxially coupled to the rotary shaft 4, a cylindrical outer race 51 arranged coaxially with the inner race 50 and radially outward of the inner race 50, and a plurality of rolling elements 52 disposed between the inner race 50 and the outer race 51. The inner race 50 and the outer race 51 are arranged at intervals from one another over an entire circumferential direction.

The oil supply channel 7 is branched into two branched oil supply channels 7a, 7b at a downstream end thereof. The branched oil supply channels 7a, 7b respectively communicate with a space between the inner race 50 and the outer race 51 via through holes 51a, 51b formed in the outer race 51. Thus, the oil supplied from the engine (not shown) via the pipe 9 sequentially flows through the contamination removing device 10, the oil supply channel 7, and the branched oil supply channels 7a, 7b to be supplied to the space between the inner race 50 and the outer race 51.

The oil discharge channel 8 has one end which communicates with open ends 5a, 5b on both sides of the rolling bearing 5 in the axial direction and the space between the inner race 50 and the outer race 51, and the other end which communicates with a discharge hole 53 opening to the oil discharge channel 8. Thus, the oil supplied to the space between the inner race 50 and the outer race 51 is discharged to the oil discharge channel 8 via the open ends 5a, 5b and the discharge hole 53, flows through the oil discharge channel 8, and then is discharged from the turbocharger 1.

Figure 2:
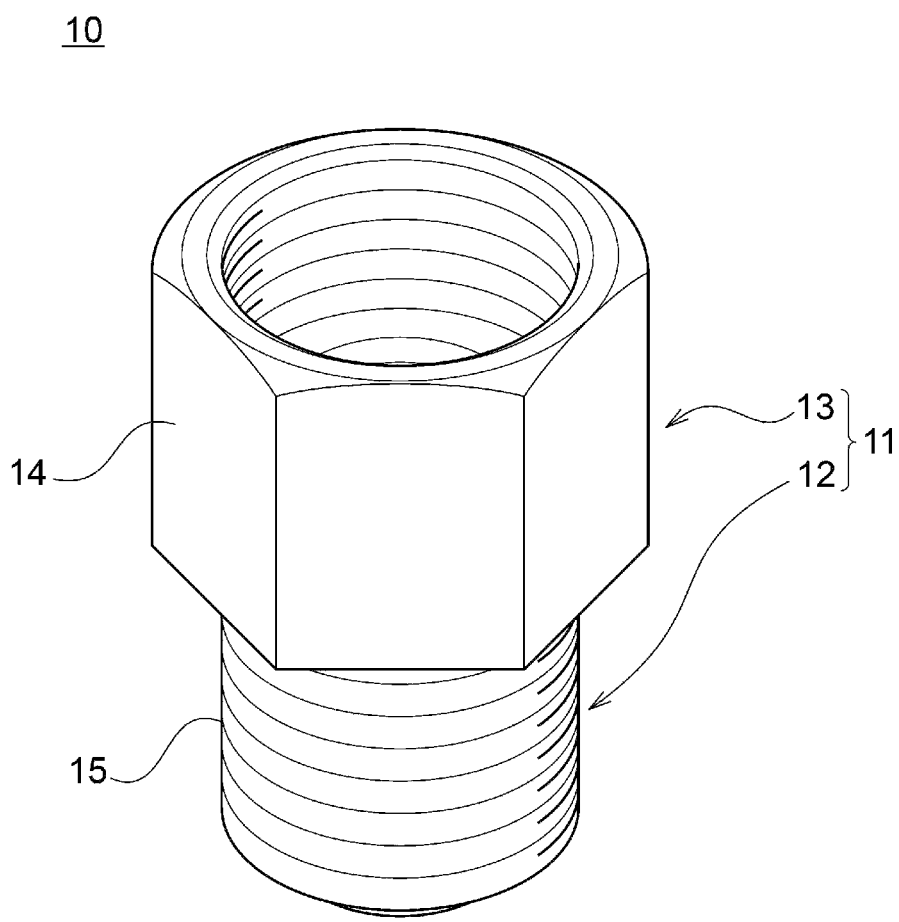
FIG. 2 is a perspective view of a contamination removing device according to Embodiment 1 of the present invention.
Figure 3:
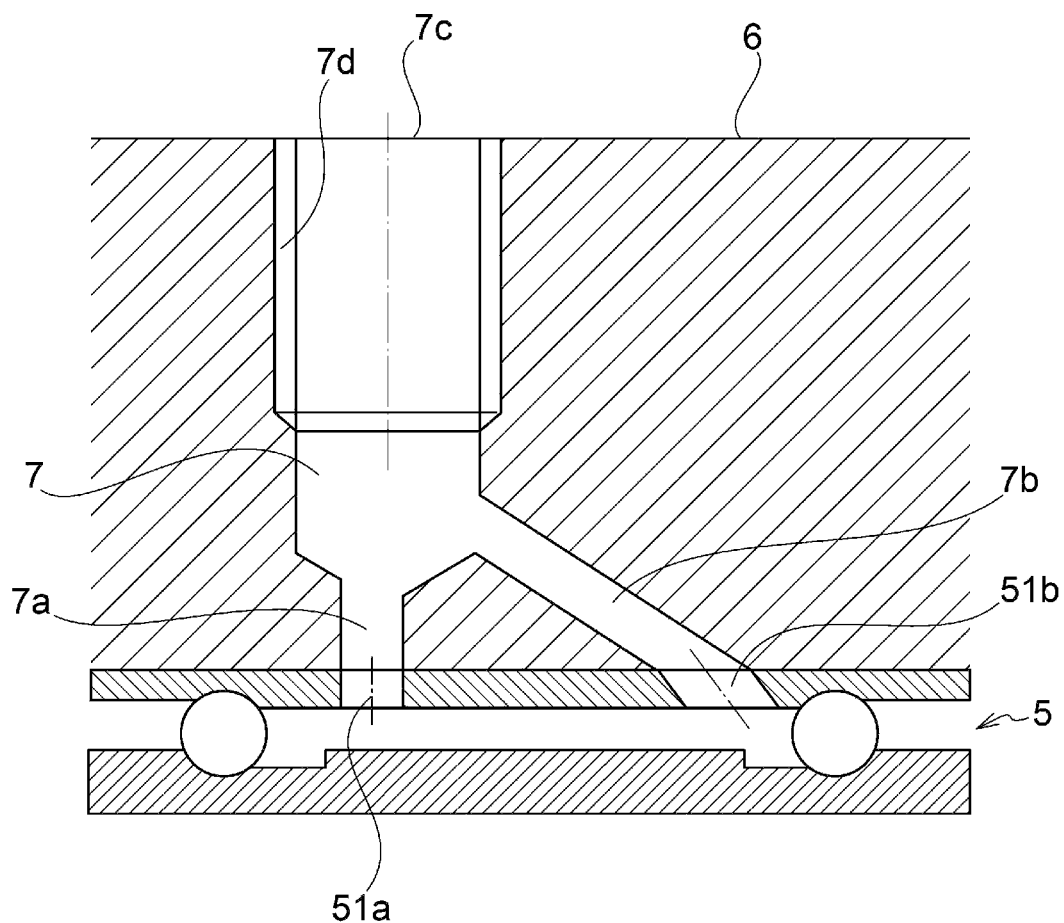
FIG. 3 is a partial cross-sectional view of an oil supply channel formed in a housing of the turbocharger according to Embodiment 1 of the present invention.

As shown in FIG. 2, the contamination removing device 10 includes a body portion 11. The body portion 11 includes an insertion attachment portion 12 and a head portion 13 shaped into a hexagonal column by six flat side surfaces 14. The body portion 11 is an attachment for attaching the contamination removing device 10 to the housing 6 of the turbocharger 1 by an operation to be described later. On the outer circumferential surface of the insertion attachment portion 12, a first male screw 15 is formed. As shown in FIG. 3, on the inner circumferential surface of the oil supply channel 7, a first female screw 7d is formed from an opening 7c of the oil supply channel 7 in the housing 6 toward the rolling bearing 5. The inner diameter of the oil supply channel 7 and the outer diameter of the insertion attachment portion 12 have the same diameter. That is, the root diameter of the first female screw 7d and the outer diameter of the first male screw 15 have the same diameter. Thus, it is possible to attach the contamination removing device 10 to the housing 6 by inserting the insertion attachment portion 12 into the oil supply channel 7 from the opening 7c of the oil supply channel 7 in the housing 6 while screwing the first female screw 7d and the first male screw 15 together.

As shown in FIG. 2, it is possible to screw the first male screw 15 and the first female screw 7d together by turning the body portion 11 while holding the flat side surfaces 14 with a tool (not shown) such as a spanner when inserting the insertion attachment portion 12 into the oil supply channel 7 (see FIG. 3). Thus, it possible to easily attach the contamination removing device 10 to the housing 6 (see FIG. 3). Since the tool is fixed to the body portion by holding the flat side surfaces 14, the side surfaces 14 serve as a tool fixing portion for fixing the tool to the body portion 11.

Figure 4:
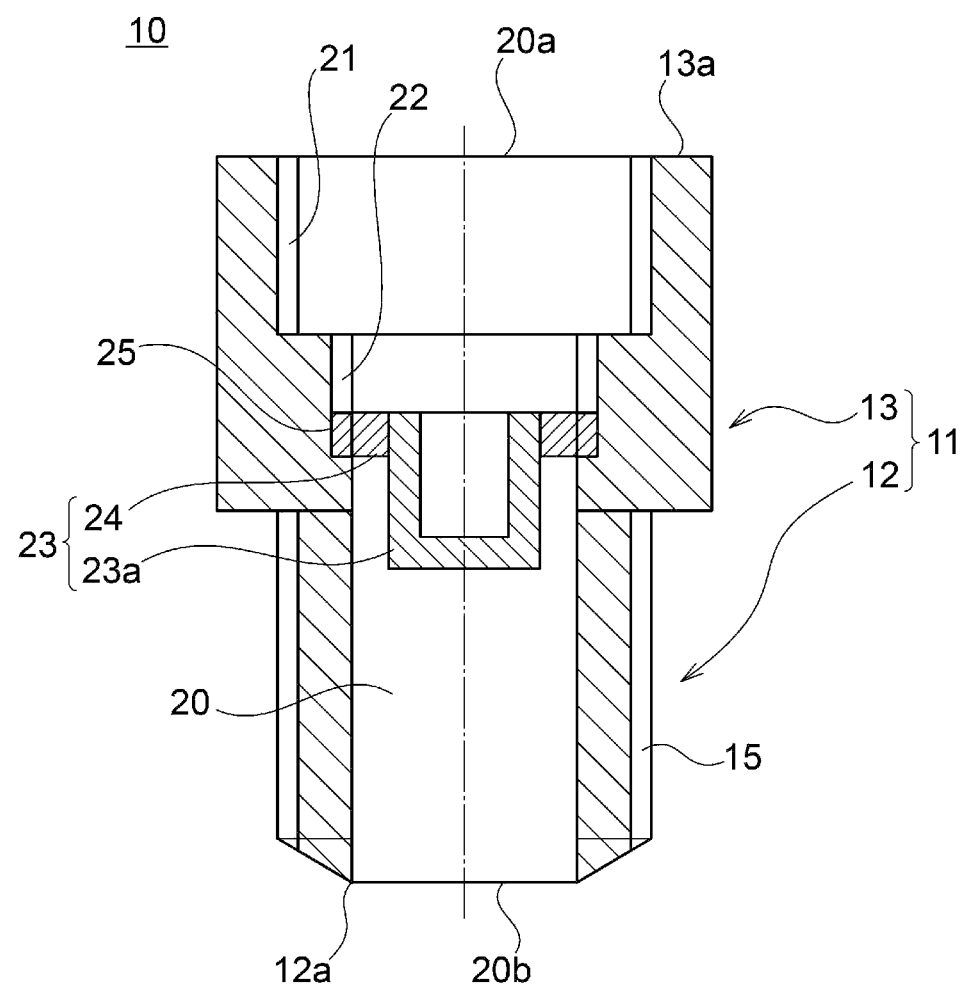
FIG. 4 is a cross-sectional view of the contamination removing device according to Embodiment 1 of the present invention.

As shown in FIG. 4, in the body portion 11 of the contamination removing device 10, an oil channel 20 penetrating in the axial direction of the body portion 11 is formed. The oil channel 20 is configured such that one open end 20a thereof opens to an upper end surface 13a of the head portion 13, and the other open end 20b thereof opens to an end 12a of the insertion attachment portion 12. On the inner circumferential surface of the oil channel 20, a connection portion 21 serving as a female screw is formed from the open end 20a toward the open end 20b. The connection portion 21 is configured to be screwable with a male screw formed at the tip of the pipe 9 (see FIG. 1).

In addition, on the inner circumferential surface of the oil channel 20, a second female screw 22 is also formed toward the open end 20b following a region where the connection portion 21 is formed. A contamination removing element 23 includes a filter 23a of a cup shape and a cylindrical holding member 24 holding the filter 23a. On the outer circumferential surface of the holding member 24, a second male screw 25 configured to be screwable with the second female screw 22 is formed. Screwing the second male screw 25 to the second female screw 22, the holding member 24 holding the filter 23a is provided in the oil channel 20. That is, it is possible to easily provide the contamination removing element 23 in the oil channel 20 by screwing the second male screw 25 to the second female screw 22. The holding member 24 is not limited to the above-described configuration. In a configuration where the second female screw 22 is not formed on the inner circumferential surface of the oil channel 20, and the second male screw 25 is not formed in the holding member 24, the holding member 24 holding the filter 23a may be configured to be pushed into the oil channel 20 by an interference fit. In this case, the filter 23a may be replaced by replacing the contamination removing device 10 itself or by pushing the holding member 24 holding the filter 23a from the opposite end of the oil channel 20 to be removed.

In the contamination removing device 10, it is possible to provide, in the oil channel 20, the filter 23a having specifications different from specifications of the filter for oil for lubricating each part of the engine. For example, it is possible to provide, in the oil channel 20, the filter 23a having a mesh size which causes clogging in a short term if used for the oil for lubricating each part of the engine, such as 3 to 15 µm, preferably 10 µm. In order to lubricate the rolling bearing 5 (see FIG. 1), it is necessary to use oil having less contaminations than the oil lubricating each part of the engine. Thus, it is possible to prepare oil suitable for lubricating the rolling bearing 5 by the filter 23a and to supply the prepared oil to the rolling bearing 5.

Next, the operation of the contamination removing device 10 will be described.

As shown in FIG. 1, the oil for lubricating each part of the engine (not shown) is partially supplied to the contamination removing device 10 via the pipe 9. The oil supplied to the contamination removing device 10 has its contaminations removed by the filter 23a (see FIG. 4) when flowing through the oil channel 20 (see FIG. 4). As described above, since the mesh size of the filter 23a is smaller than that of the filter for the oil lubricating each part of the engine, the oil flowing through the contamination removing device 10 has less contaminations than the oil lubricating each part of the engine. The oil having less contaminations sequentially flows through the oil supply channel 7, the branched oil supply channels 7a, 7b, and the through holes 51a, 51b and is supplied to the rolling bearing 5, that is, the space between the inner race 50 and the outer race 51 to lubricate the rolling bearing 5. The oil supplied to the space between the inner race 50 and the outer race 51 flows out to the oil discharge channel 8 from the rolling bearing 5 via the open ends 5a, 5b or the discharge hole 53, flows through the oil discharge channel 8, and then is discharged from the turbocharger 1.

Thus, since it is possible to attach, to the contamination removing device, the filter 23a having the specifications different from specifications of a filter for removing the contaminations from the oil for lubricating each part of the engine provided with the turbocharger 1, it is possible to remove the contaminations from the oil to such an extent suitable for lubricating the rolling bearing 5. Moreover, since the body portion 11 including the filter 23a is detachable from the housing of the turbocharger, it is possible to easily replace the filter 23a when contamination removal performance thereof decreases.

Figure 5:
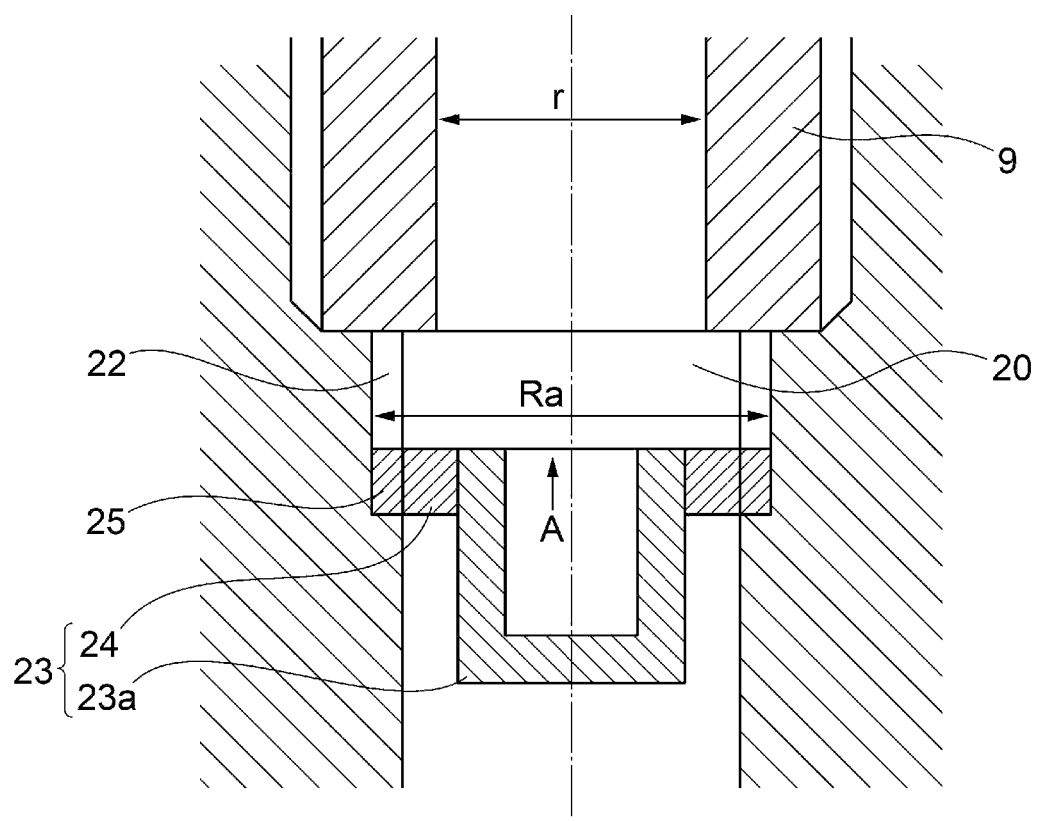
FIG. 5 is a partial cross-sectional view of the contamination removing device according to Embodiment 1 of the present invention.

As shown in FIG. 5, in Embodiment 1, it is possible to configure such that an inner diameter r of the pipe 9 is smaller than an outer diameter $R_a$ of the holding member 24 of the contamination removing element 23. With the above configuration, during operation of the turbocharger 1 (see FIG. 1), even if the contamination removing element 23 provided in the oil channel 20 moves within the oil channel 20 toward the open end 20a (see FIG. 4) (in the direction of an arrow A) by loosening screw between the second male screw 25 and the second female screw 22, farther movement of the contamination removing element 23 is restricted by abutting on an end surface 9a of the pipe 9, making it possible to prevent the contamination removing element 23 from falling off the oil channel 20. In this case, the end surface 9a of the pipe 9 serves as a retaining portion for preventing the contamination removing element 23 from falling off the oil channel 20.

As shown in FIG. 4, in Embodiment 1, the root diameter of the connection portion 21 serving as the female screw portion and the outer diameter of the first male screw 15 can have the same diameter in the contamination removing device 10. As shown in FIG. 1, the pipe 9 is directly connected to the oil supply channel 7 if the turbocharger 1 does not include the contamination removing device 10. In this case, the outer diameter of the male screw portion (not shown) formed at the tip of the pipe 9 and the root diameter of the first female screw 7d (see FIG. 3) of the oil supply channel 7 have the same diameter. Configuring such that the root diameter of the connection portion 21 and the outer diameter of the male screw portion formed at the tip of the pipe 9 have the same diameter, and configuring such that the outer diameter of the first male screw 15 and the root diameter of the first female screw 7d have the same diameter, it is possible to attach the contamination removing device 10 between the pipe 9 and the oil supply channel 7.

Therefore, it is possible to use the contamination removing device 10 for the existing turbocharger.

Embodiment 2

Next, a contamination removing device according to Embodiment 2 will be described. The contamination removing device according to Embodiment 2 is obtained by modifying Embodiment 1 in terms of the contamination removing element. In Embodiment 2, the same constituent elements as those in Embodiment 1 are associated with the same reference numerals and not described again in detail.

Figure 6:
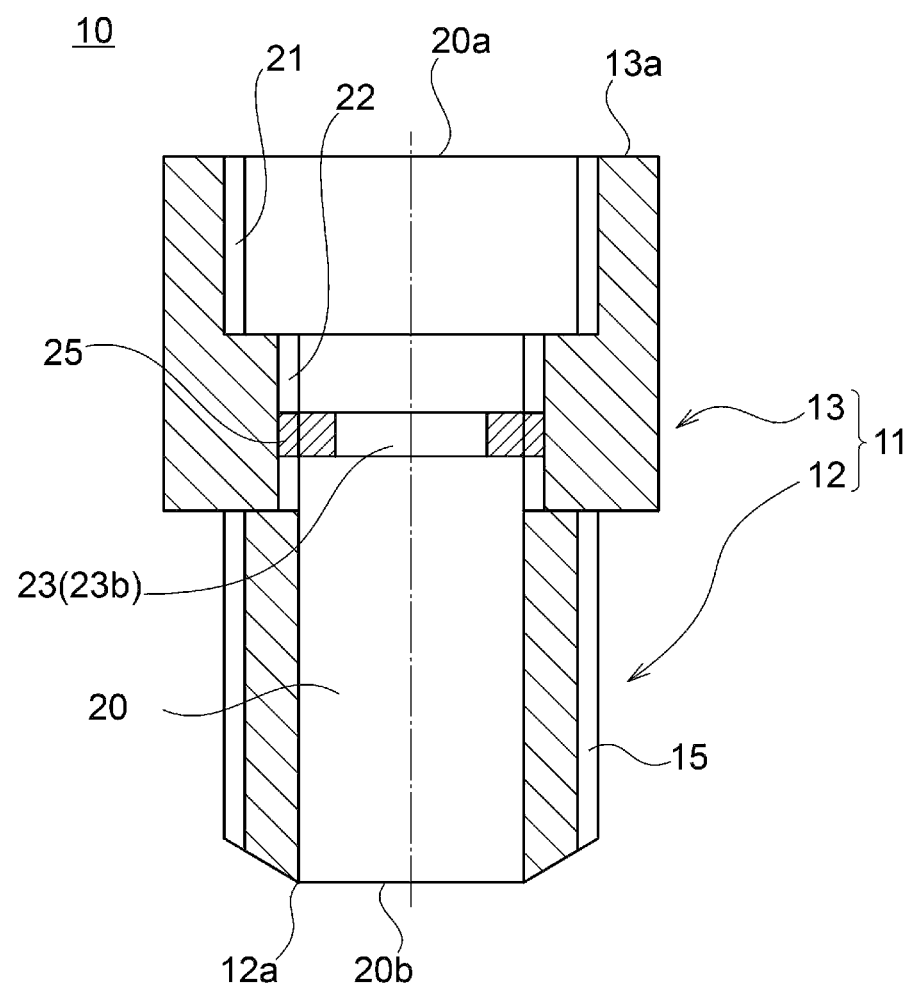
FIG. 6 is a cross-sectional view of the contamination removing device according to Embodiment 2 of the present invention.

As shown in FIG. 6, in Embodiment 2, the contamination removing element 23 is a cylindrical magnet 23b. On the outer circumferential surface of the magnet 23b, the second male screw 25 screwing to the second female screw 22 is formed. That is, the cylindrical magnet 23b is provided in the oil channel 20 coaxially with the oil channel 20. Other configurations are the same as Embodiment 1.

The oil supplied to the contamination removing device 10 by the same operation as Embodiment 1 flows through the oil channel 20. The oil flows inside the cylindrical magnet 23b when flowing through the oil channel 20. Contaminations included in oil are often substances attracted to a magnet, such as metallic powder. Thus, the contaminations are removed from oil by being attracted to the magnet 23b when the oil flows inside the magnet 23b. The oil having its contaminations thus removed is supplied to the rolling bearing 5 (see FIG. 1) by the same operation as Embodiment 1, lubricating the rolling bearing 5.

In Embodiment 2 as well, since it is possible to attach, to the contamination removing device 10, the magnet 23b which serves as the contamination removing element 23 having specifications different from the specifications of the filter for removing the contaminations from the oil for lubricating each part of the engine provided with the turbocharger 1, it is possible to remove the contaminations from the oil to such an extent suitable for lubricating the rolling bearing 5. Moreover, since the body portion 11 including the magnet 23b is detachable from the housing of the turbocharger, it is possible to easily replace the magnet 23b when contamination removal performance thereof decreases.

Furthermore, the magnet 23b is not clogged unlike the filter 23a and has a lower oil supply resistance than the filter 23a, making it possible to suppress a possibility of a trouble in supplying oil to the rolling bearing 5 as compared with a case in which the filter 23a is used. The contamination removal performance of the filter 23a can be adjusted by selecting the mesh size. The contamination removal performance of the magnet 23b can be adjusted by adjusting the axial length of the magnet 23b and/or the strength of a magnetic force of the magnet 23b.

Figure 7:
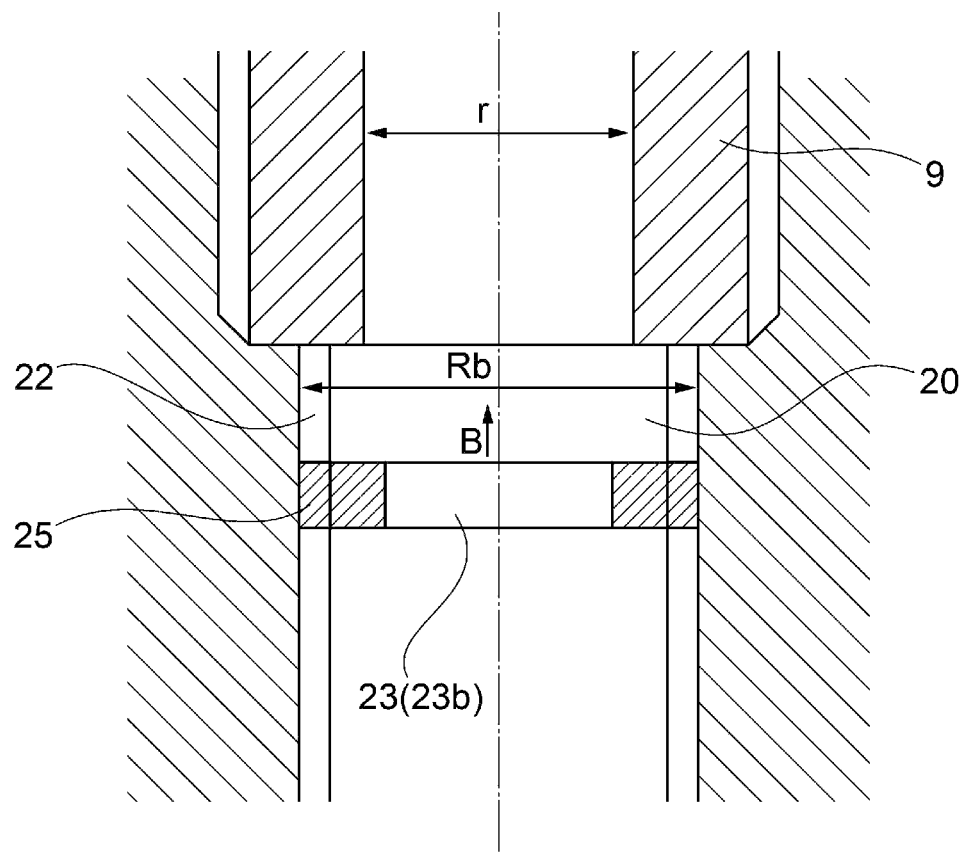
FIG. 7 is a partial cross-sectional view of the contamination removing device according to Embodiment 2 of the present invention.

As shown in FIG. 7, in Embodiment 2, it is possible to configure such that the inner diameter r of the pipe 9 is smaller than an outer diameter $R_b$ of the magnet 23b. With the above configuration, during operation of the turbocharger 1 (see FIG. 1), even if the magnet 23b provided in the oil channel 20 moves within the oil channel 20 toward the open end 20a (see FIG. 6) (in the direction of an arrow B) by loosening screw between the second male screw 25 and the second female screw 22, farther movement of the magnet 23b is restricted by abutting on the end surface 9a (retaining portion) of the pipe 9, making it possible to prevent the magnet 23b from falling off the oil channel 20.

Embodiment 3

Next, a contamination removing device according to Embodiment 3 will be described. The contamination removing device according to Embodiment 3 is obtained by modifying Embodiment 1 in terms of the body portion of the contamination removing device. In Embodiment 3, the same constituent elements as those in Embodiment 1 are associated with the same reference numerals and not described again in detail.

Figure 8:
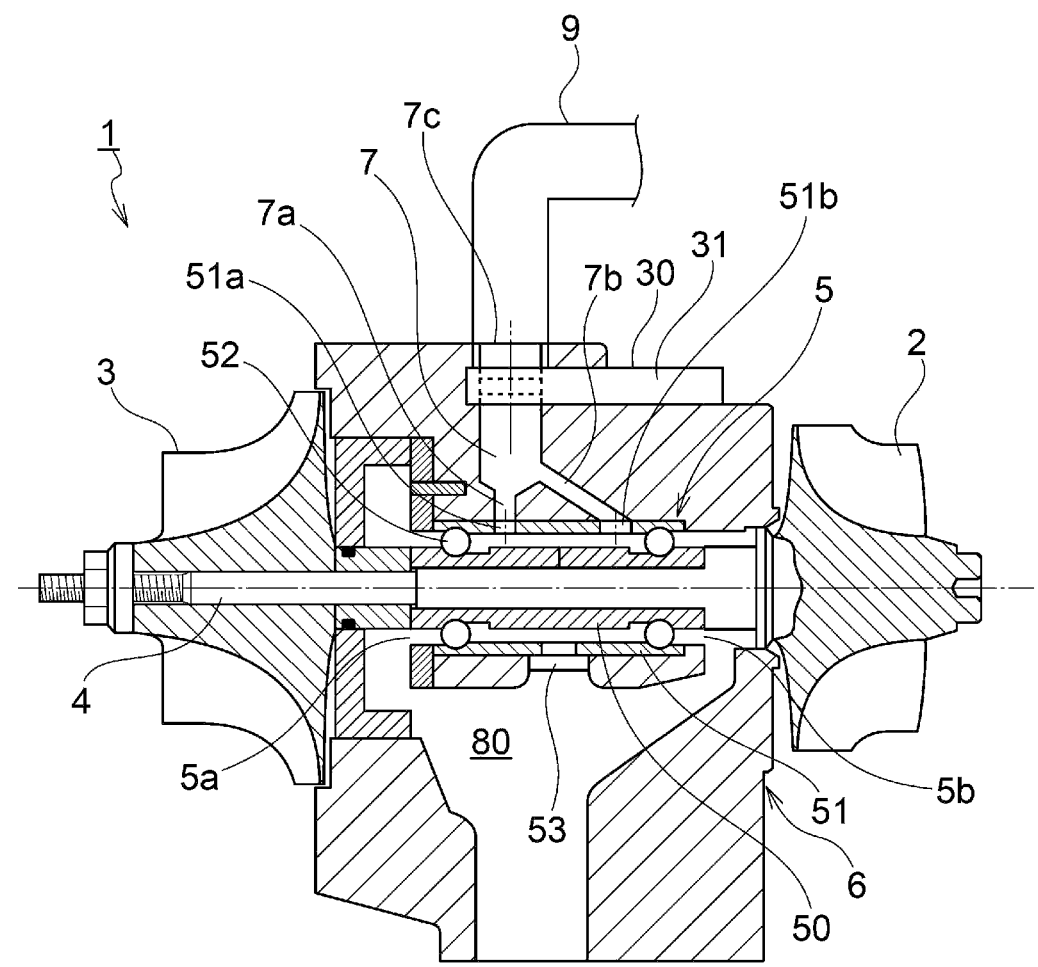
FIG. 8 is a cross-sectional view of the turbocharger according to Embodiment 3 of the present invention.
Figure 9:
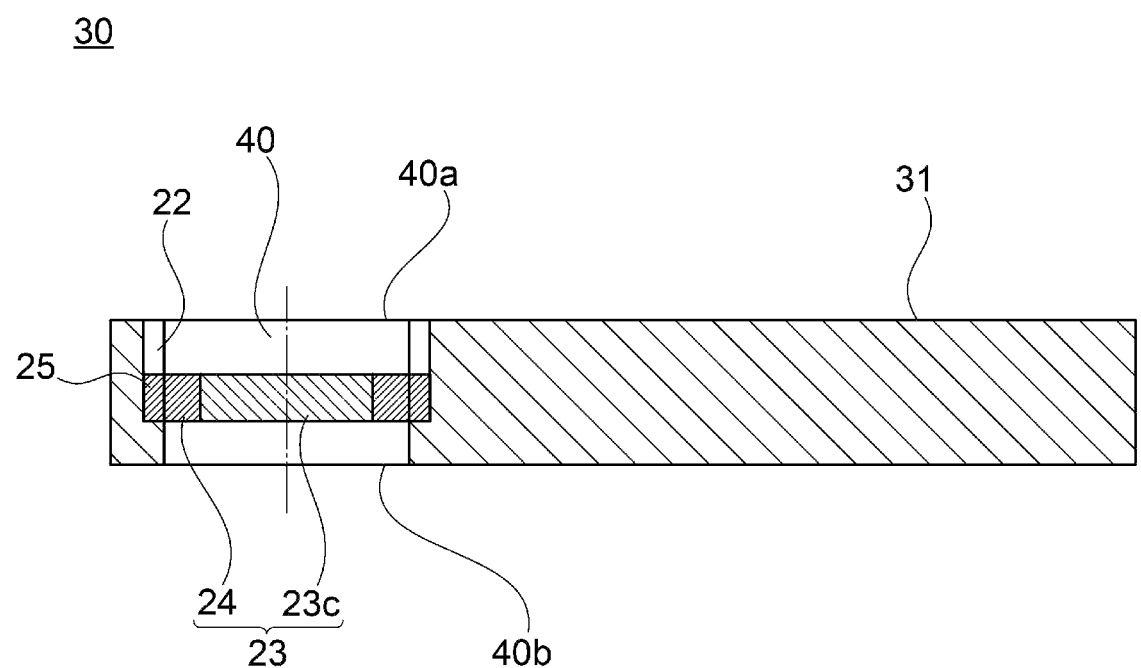
FIG. 9 is a cross-sectional view of the contamination removing device according to Embodiment 3 of the present invention.

As shown in FIG. 8, a contamination removing device 30 is attached to the housing 6 such that the axial direction of the body portion 31 and the axial direction of the oil supply channel 7 intersect between the rolling bearing 5 and the opening 7c of the oil supply channel 7. As shown in FIG. 9, the contamination removing device 30 has a cuboid body portion 31. In the body portion 31, an oil channel 40 is formed, which penetrates in a direction orthogonal to the axial direction of the body portion 31. On the inner circumferential surface of the oil channel 40, the second female screw 22 is formed from one open end 40a toward the other open end 40b of the oil channel 40. The contamination removing element 23 includes a filter 23c of a disc shape and the cylindrical holding member 24 holding the filter 23c. On the outer circumferential surface of the holding member 24, the second male screw 25 configured to be screwable with the second female screw 22 is formed. Screwing the second male screw 25 to the second female screw 22, the holding member 24 holding the filter 23c is provided in the oil channel 40. That is, it is possible to easily provide the contamination removing element 23 in the oil channel 40 by screwing the second male screw 25 to the second female screw 22.

Figure 10:
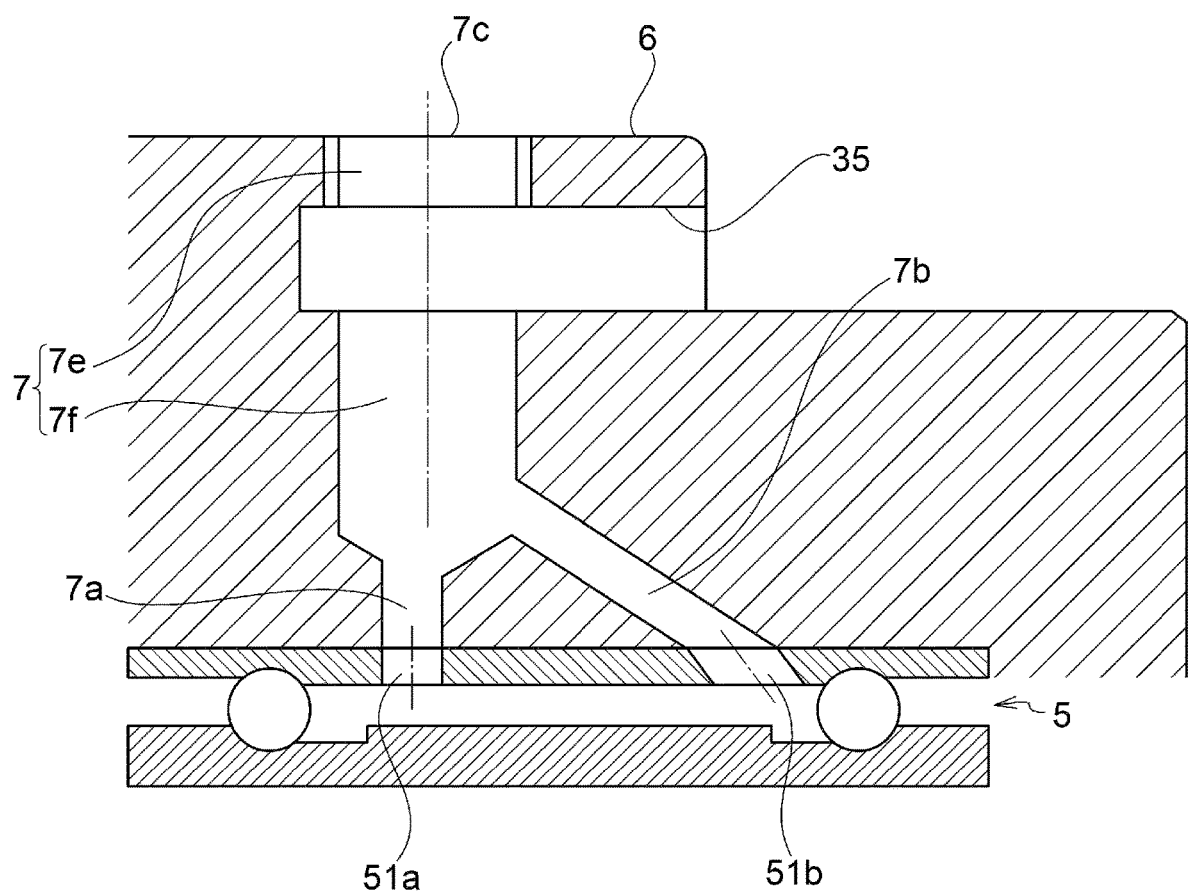
FIG. 10 is a partial cross-sectional view of an oil supply channel formed in the housing of the turbocharger according to Embodiment 3 of the present invention.

As shown in FIG. 10, in the housing 6, an attachment hole portion 35 is formed into which the body portion 31 of the contamination removing device 30 (see FIG. 9) can be inserted. The attachment hole portion 35 divides the oil supply channel 7 into a first oil supply channel portion 7e having the opening 7c and a second oil supply channel portion 7f to which the branched oil supply channels 7a, 7b are connected. Inserting the body portion 31 of the contamination removing device 30 into the attachment hole portion 35, the oil channel 40 (see FIG. 9) can make the first oil supply channel portion 7e and the second oil supply channel portion 7f communicate with each other, and the oil flowing through the pipe 9 (see FIG. 8) sequentially flows through the first oil supply channel portion 7e, the oil channel 40, the second oil supply channel portion 7f, and the branched oil supply channels 7a, 7b to be supplied to the rolling bearing 5. Other configurations are the same as Embodiment 1.

In Embodiment 3, forming, in the housing 6 in advance, the attachment hole portion 35 into which the body portion 31 of the contamination removing device 30 is to be inserted, it is possible to attach the contamination removing device 30 to the housing 6 just by inserting the body portion 31 of the contamination removing device 30 into the attachment hole portion 35. Thus, it is possible to easily attach the contamination removing device 30.

As shown in FIG. 8, contaminations are removed from oil by the filter 23c (see FIG. 9) when the oil having flowed through the pipe 9 flows through the oil supply channel 7. Therefore, it is possible to obtain the same effect as Embodiment 1.

Figure 11:
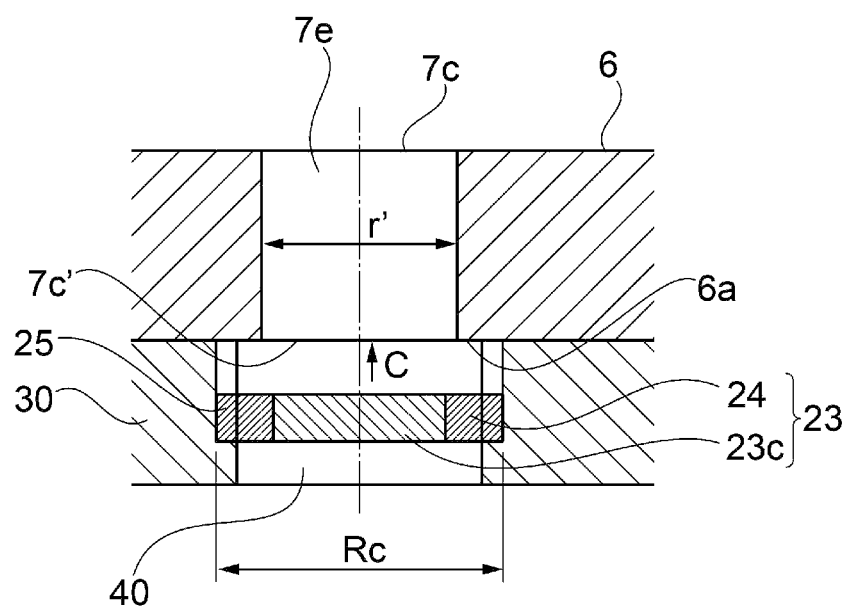
FIG. 11 is a partial cross-sectional view of the contamination removing device according to Embodiment 3 of the present invention.

As shown in FIG. 11, in Embodiment 3, it is possible to configure such that an inner diameter r' of the first oil supply channel portion 7e is smaller than an outer diameter $R_c$ of the holding member 24 of the contamination removing element 23. With the above configuration, during operation of the turbocharger 1 (see FIG. 8), even if the contamination removing element 23 provided in the oil channel 40 moves within the oil channel 40 toward the open end 40a (see FIG.

8) (in the direction of an arrow C) by loosening screw between the second male screw 25 and the second female screw 22, farther movement of the contamination removing element 23 is restricted by an end surface 6a of the housing 6 defining an opening 7c' of the first oil supply channel portion 7e on a side opposite to the opening 7c, making it possible to prevent the contamination removing element 23 from falling off the oil channel 40. In this case, the end surface 6a of the housing 6 serves as a retaining portion for preventing the contamination removing element 23 from falling off the oil channel 40.

Figure 12:
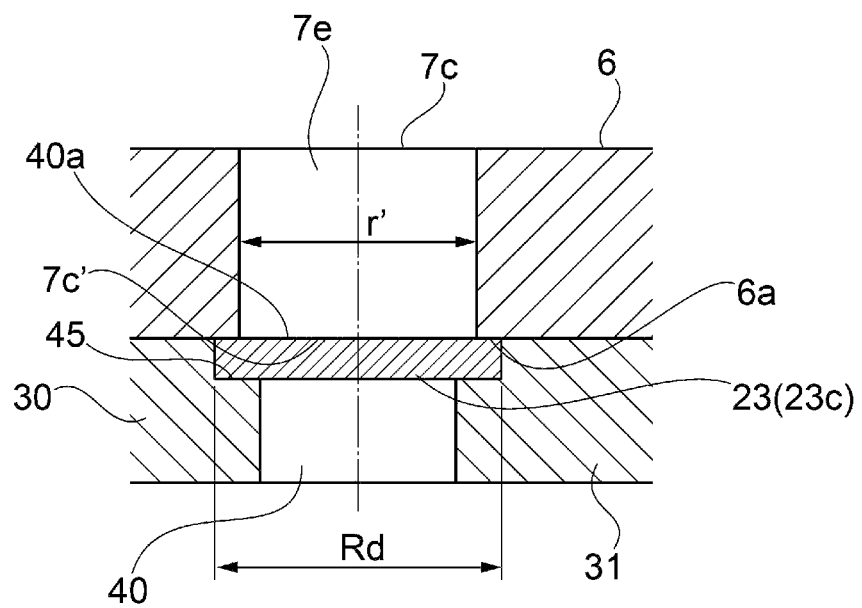
FIG. 12 is a partial cross-sectional view of a modified example of the contamination removing device according to Embodiment 3 of the present invention.

Moreover, as shown in FIG. 12, in Embodiment 3, in the body portion 31 of the contamination removing device 30, a recessed portion 45 may be formed, which includes the open end 40a of the oil channel 40 and is recessed from the surface of the body portion 31 concentrically with the oil channel 40. The disc-shaped filter 23c may be arranged in the recessed portion 45 to make the surface of the filter 23c and the surface of the body portion 31 flush with each other. In this case, it is configured such that the inner diameter r' of the first oil supply channel portion 7e is smaller than an outer diameter $R_d$ of the filter 23c. In the configuration, attaching the contamination removing device 30 to the housing 6, the filter 23c is retained by the end surface 6a of the housing 6 defining the opening 7c' of the first oil supply channel portion 7e. Thus, it is possible to prevent the filter 23c from falling off the oil channel 40. In this case as well, the end surface 6a of the housing 6 serves as a retaining portion for preventing the filter 23c from falling off the oil channel 40.

Embodiment 4

Next, a contamination removing device according to Embodiment 4 will be described. The contamination removing device according to Embodiment 4 is obtained by modifying Embodiment 3 in terms of the contamination removing element. In Embodiment 4, the same constituent elements as those in Embodiment 3 are associated with the same reference numerals and not described again in detail.

Figure 13:
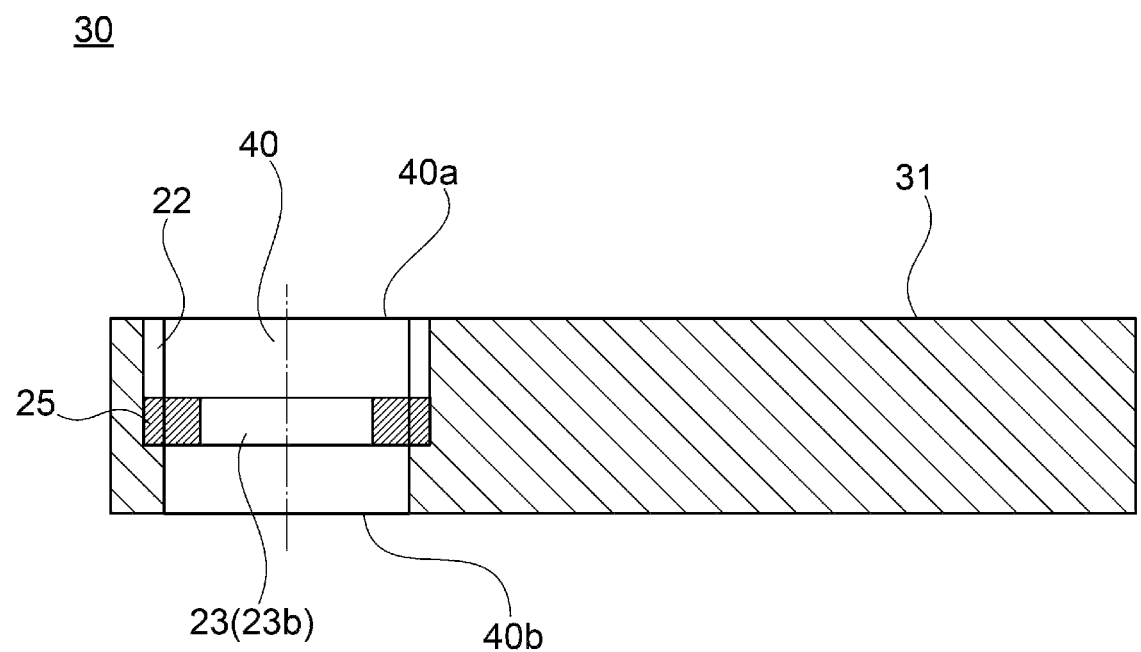
FIG. 13 is a cross-sectional view of the contamination removing device according to Embodiment 4 of the present invention.

As shown in FIG. 13, in Embodiment 4, the contamination removing element 23 is a cylindrical magnet 23b. On the outer circumferential surface of the magnet 23b, the second male screw 25 screwing to the second female screw 22 is formed. That is, the cylindrical magnet 23b is provided in the oil channel 40 coaxially with the oil channel 40. Other configurations are the same as Embodiment 3.

Oil is supplied to the contamination removing device 30 by the same operation as Embodiment 3. A principle that contaminations are removed from oil by the magnet 23b provided in the contamination removing device 30 is the same as Embodiment 2. The oil having its contaminations removed by the magnet 23b is supplied to the rolling bearing 5 (see FIG. 8) by the same operation as Embodiment 3, lubricating the rolling bearing 5. Therefore, it is possible to obtain the same effect as Embodiment 2.

An advantage of using the magnet 23b, instead of the filter 23c, as the contamination removing element 23 and a method of adjusting the contamination removal performance of the magnet 23b are the same as Embodiment 2.

Figure 14:
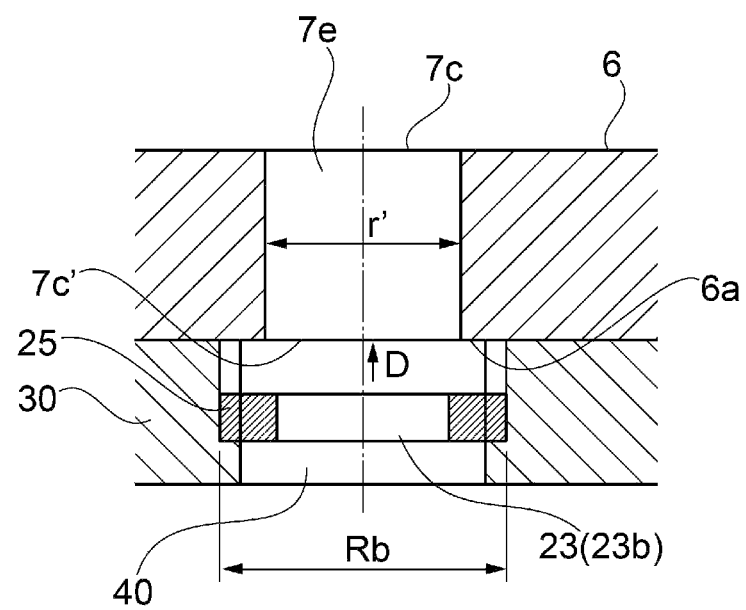
FIG. 14 is a partial cross-sectional view of the contamination removing device according to Embodiment 4 of the present invention.

As shown in FIG. 14, in Embodiment 4, it is possible to configure such that the inner diameter r' of the first oil supply channel portion 7e is smaller than the outer diameter $R_b$ of the magnet 23b. With the above configuration, during operation of the turbocharger 1 (see FIG. 8), even if the magnet 23b provided in the oil channel 40 moves within the oil channel 40 toward the open end 40a (see FIG. 8) (in the direction of an arrow D) by loosening screw between the second male screw 25 and the second female screw 22, farther movement of the magnet 23b is restricted by the end surface 6a of the housing 6 defining the opening 7c' of the first oil supply channel portion 7e on the side opposite to the opening 7c, making it possible to prevent the magnet 23b from falling off the oil channel 40. In this case, the end surface 6a of the housing 6 serves as a retaining portion for preventing the magnet 23b from falling off the oil channel 40.

Figure 15:
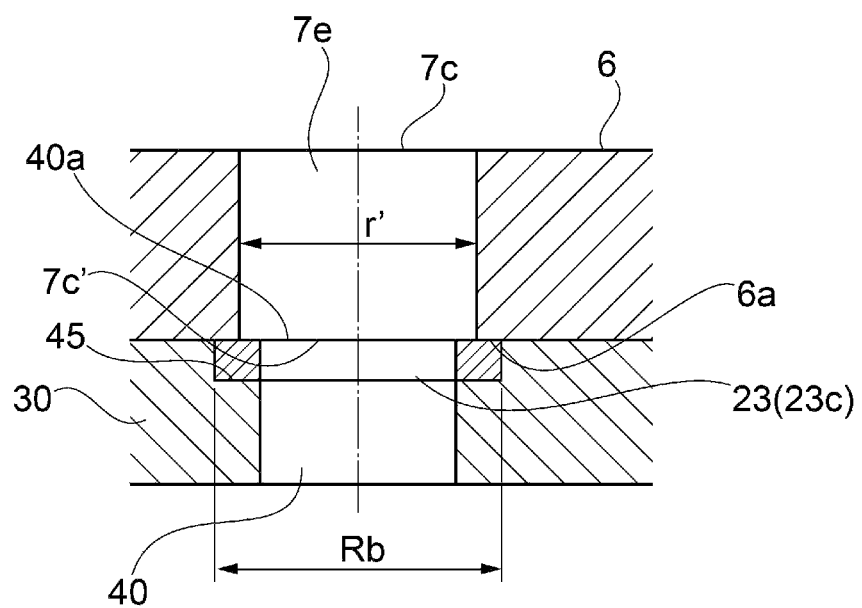
FIG. 15 is a partial cross-sectional view of a modified example of the contamination removing device according to Embodiment 4 of the present invention.

Moreover, as shown in FIG. 15, in Embodiment 4, in the body portion 31 of the contamination removing device 30, the recessed portion 45 may be formed, which includes the open end 40a of the oil channel 40 and is recessed from the surface of the body portion 31 concentrically with the oil channel 40. The cylindrical magnet 23b may be arranged in the recessed portion 45 to make the surface of the magnet 23b and the surface of the body portion 31 flush with each other. In this case, it is configured such that the inner diameter r' of the first oil supply channel portion 7e is smaller than the outer diameter $R_b$ of the magnet 23b. In the configuration, attaching the contamination removing device 30 to the housing 6, the magnet 23b is retained by the end surface 6a of the housing 6 defining the opening 7c' of the first oil supply channel portion 7e. Thus, it is possible to prevent the magnet 23b from falling off the oil channel 40. In this case as well, the end surface 6a of the housing 6 serves as the retaining portion for preventing the magnet 23b from falling off the oil channel 40.

Embodiment 5

Next, a contamination removing device according to Embodiment 5 will be described. In Embodiment 5, the contamination removing device according to Embodiment 2 and the contamination removing device according to Embodiment 3 are attached to the turbocharger. In Embodiment 5, the same constituent elements as those in Embodiments 2 and 3 are associated with the same reference numerals and not described again in detail.

Figure 16:
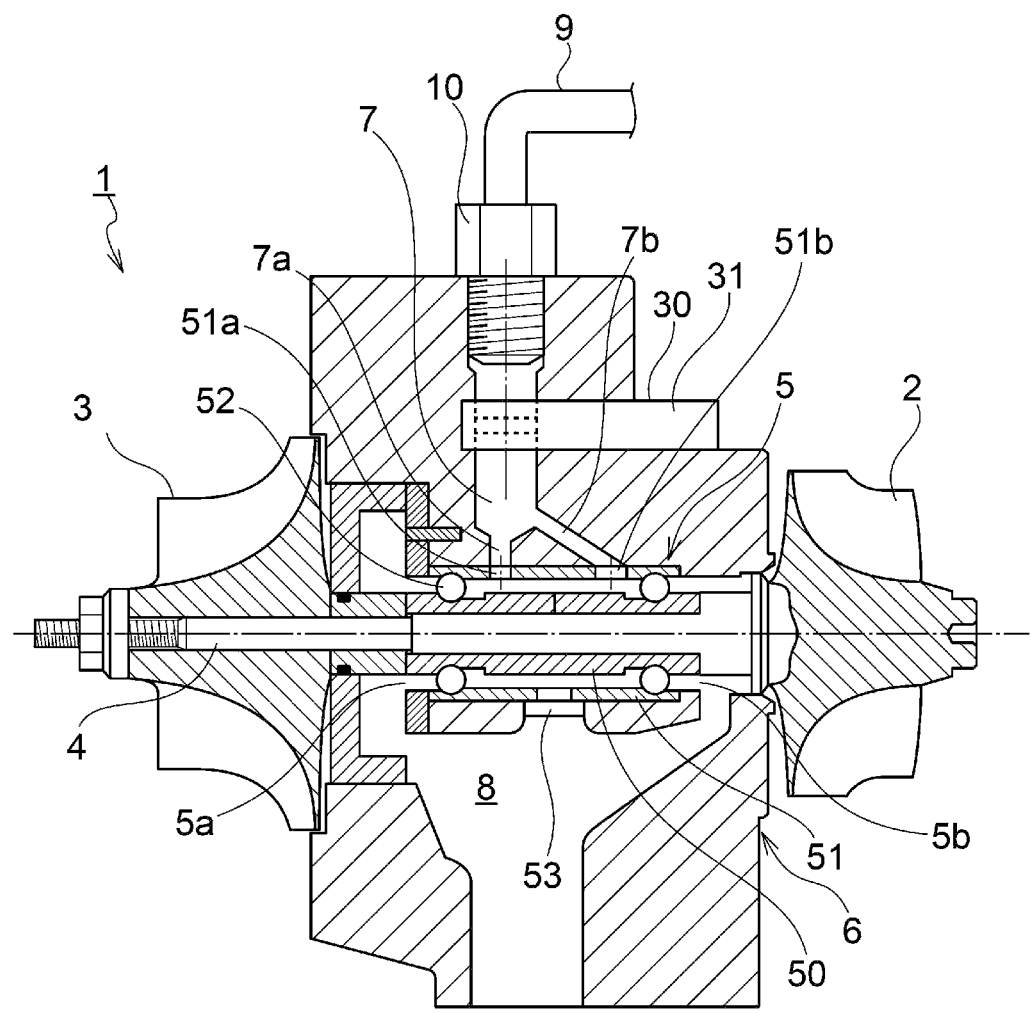
FIG. 16 is a cross-sectional view of the turbocharger according to Embodiment 5 of present invention.

As shown in FIG. 16, the contamination removing device 10 according to Embodiment 2 is attached to the housing 6 of the turbocharger 1 by the configuration described in Embodiment 2. Moreover, the contamination removing device 30 according to Embodiment 3 are attached to the housing 6 of the turbocharger 1 with the configuration described in Embodiment 3. Other configurations are the same as Embodiments 2 and 3.

The oil for lubricating each part of the engine (not shown) is partially supplied to the contamination removing device 10 via the pipe 9. The oil supplied to the contamination removing device 10 has its contaminations attracted to the magnet 23b (see FIG. 6) to be removed when flowing through the oil channel 20 of the contamination removing device 10 (see FIG. 6). Subsequently, the oil flows into the contamination removing device 30. The oil has its contaminations removed by the filter 23c (see FIG. 9) when flowing through the oil channel 40 of the contamination removing device 30 (see FIG. 9). Since the filter 23c removes the contaminations after the contaminations are removed by the magnet 23b in the above configuration, the quantity of the contaminations removed by the filter 23c is reduced as compared with a configuration in which the filter 23c first removes the contaminations from the oil flowing through the pipe 9. Thus, it is possible to increase a time before the filter 23c is clogged, that is, the lifetime of the filter 23c. An operation of lubricating the rolling bearing 5 with the oil from which the contaminations are removed in two stages by the contamination removing devices 10 and 30 is the same as Embodiments 2 and 3.

Since the contaminations can be removed from the oil in the two stages by the contamination removing devices 10 and 30, it is possible to lubricate the rolling bearing 5 with cleaner oil.

In Embodiment 5, it is possible to apply some modified examples described in Embodiment 2 to the contamination removing device 10 and to apply some modified examples described in Embodiment 3 to the contamination removing device 30.

In Embodiment 5, the contamination removing element 23 of the contamination removing device 10 is the magnet 23b, and the contamination removing element of the contamination removing device 30 includes the filter 23c. However, the present invention is not limited to this configuration. It may be configured such that the contamination removing element 23 of the contamination removing device 10 includes the filter 23a, and the contamination removing element of the contamination removing device 30 is the magnet 23b, it may be configured such that the respective contamination removing elements 23 of the contamination removing devices 10 and 30 include the filters 23a and 23c, or it may be configured such that the contamination removing element 23 of each of the contamination removing devices 10 and 30 is the magnet 23b.

In Embodiments 1, 2 and 5, the head portion 13 of the contamination removing device 10 has the hexagonal column shape. However, the head portion 13 is not limited to this shape. It is only necessary that there are at least two flat side surfaces 14 so that the head portion 13 can be nipped by a tool. Since a polygonal column shape has not less than three side surfaces, the head portion 13 may have an arbitrary polygonal column shape. In these cases, at least two flat side surfaces and side surfaces forming the arbitrary polygonal column each serve as a tool fixing portion. Furthermore, the tool fixing portion is not limited to the flat side surface of the head portion 13. For example, if the tool is a wrench of a type with a handle in a tubular socket, a groove having the same shape as the cross-sectional shape of the socket is formed in the upper end surface 13a of the head portion 13, and the tool is turned while inserting the socket in the groove, making it possible to turn the body portion 11. In this case, the groove serves as a tool fixing portion.

REFERENCE SIGNS LIST

1 Turbocharger
2 Turbine rotor
3 Compressor rotor
4 Rotary shaft
5 Rolling bearing
5a Open end
5b Open end
6 Housing
6a End surface (retaining portion)
7 Oil supply channel
7a Branched oil supply channel
7b Branched oil supply channel
7c Opening
7c' Opening
7d First female screw
7e First oil supply channel portion
7f Second oil supply channel portion
8 Oil discharge channel
9 Pipe
9a End surface (retaining portion)
10 Contamination removing device
11 Body portion
12 Insertion attachment portion
12a End
13 Head portion
13a Upper end surface
14 Side surface (tool fixing portion)
15 First male screw
20 Oil channel
20a Open end
20b Open end
21 Connection portion
22 Second female screw
23 Contamination removing element
23a Filter
23b Magnet
23c Filter
24 Holding member
25 Second male screw
30 Contamination removing device
31 Body portion
35 Attachment hole portion
40 Oil channel
40a Open end
40b Open end
45 Recessed portion
50 Inner race
51 Outer race
51a Through hole
51b Through hole
52 Rolling element
53 Discharge hole

The invention claimed is:

1. A contamination removing device for removing a contamination from oil for lubricating a rolling bearing supporting a rotary shaft of a turbocharger, the contamination removing device comprising:
  a body portion including an oil channel for the oil to flow; and
  a contamination removing element for removing the contamination from the oil flowing through the oil channel, the contamination removing element being provided in the oil channel,
  wherein the body portion is configured to be detachable from the housing so that the oil channel and an oil supply channel for the oil to flow communicate with each other, the oil supply channel being formed in a housing of the turbocharger,
  wherein the oil supply channel includes:
  a first oil supply channel portion including an opening of the oil supply channel in the housing; and
  a second oil supply channel portion communicating with the rolling bearing,
  wherein the oil channel makes the first oil supply channel portion and the second oil supply channel portion communicate with each other by attaching the body portion to the housing such that the body portion intersects the oil supply channel between the rolling bearing and the opening of the oil supply channel in the housing, and
  wherein the oil channel penetrates the body portion straight in a direction orthogonal to an axial direction of the body portion, and when inserting the body portion into the attachment hole portion, axial directions of the first oil supply channel portion, the oil channel, and the second oil supply channel portion are in the same straight line.

2. The contamination removing device according to claim 1,
wherein the oil channel includes a second female screw formed on an inner circumferential surface thereof,
wherein the contamination removing element includes a second male screw screwable to the second female screw, and
wherein the second male screw is screwed to the second female screw to provide the contamination removing element in the oil channel.

3. The contamination removing device according to claim 1,
wherein the contamination removing device includes a retaining portion preventing the contamination removing element from falling off the oil channel in a state in which a pipe for the oil is connected to the oil channel or the oil supply channel and the body portion is attached to the housing, the oil being supplied from an internal combustion engine provided with the turbocharger.

4. The contamination removing device according to claim 1,
wherein the contamination removing element includes a filter provided in the oil channel.

5. The contamination removing device according to claim 4,
wherein the filter has a mesh size of 3 to 15 μm.

6. The contamination removing device according to claim 1,
wherein the contamination removing element includes a magnet provided in the oil channel.

7. A turbocharger comprising:
a turbine rotor;
a compressor rotor;
a rotary shaft connected to the turbine rotor and the compressor rotor respectively, and rotating with the turbine rotor and the compressor rotor;
a rolling bearing supporting the rotary shaft;
a housing accommodating the rolling bearing;
an oil supply channel through which oil for lubricating the rolling bearing flows, the oil supply channel being formed in the housing; and
at least one contamination removing device according to claim 1 detachably attached to the housing.

* * * * *